(12) United States Patent
Perkins et al.

(10) Patent No.: US 9,086,469 B2
(45) Date of Patent: Jul. 21, 2015

(54) LOW FREQUENCY MAGNETIC INDUCTION POSITIONING SYSTEM AND METHOD

(71) Applicant: Awarepoint Corporation, San Diego, CA (US)

(72) Inventors: Matthew R. Perkins, San Diego, CA (US); Anthony Truscott, San Diego, CA (US); Wei Geng, San Diego, CA (US)

(73) Assignee: AWAREPOINT CORPORATION, San Diego, CA (US)

( * ) Notice: Subject to any disclaimer, the term of this patent is extended or adjusted under 35 U.S.C. 154(b) by 309 days.

(21) Appl. No.: 13/792,195

(22) Filed: Mar. 11, 2013

(65) Prior Publication Data

US 2014/0191897 A1    Jul. 10, 2014

Related U.S. Application Data

(60) Provisional application No. 61/644,418, filed on May 8, 2012.

(51) Int. Cl.
| | |
|---|---|
| *G01S 3/02* | (2006.01) |
| *G07C 9/00* | (2006.01) |
| *G01B 11/14* | (2006.01) |
| *G01S 3/80* | (2006.01) |
| *G01S 5/12* | (2006.01) |

(52) U.S. Cl.
CPC . *G01S 3/02* (2013.01); *G01B 11/14* (2013.01); *G01S 3/80* (2013.01); *G07C 9/00111* (2013.01); *G01S 5/12* (2013.01)

(58) Field of Classification Search
CPC ............... G01S 3/02; G01S 3/80; G01S 5/12; G01B 11/14; G07C 9/0011

USPC .......................... 340/8.1, 539.13; 324/207.15
See application file for complete search history.

(56) References Cited

U.S. PATENT DOCUMENTS

| | | | |
|---|---|---|---|
| 5,732,401 | A | 3/1998 | Conway |
| 5,812,865 | A | 9/1998 | Theimer et al. |
| 5,977,913 | A | 11/1999 | Christ |
| 6,919,807 | B2 | 7/2005 | Shek et al. |
| 7,123,149 | B2 | 10/2006 | Nowak et al. |
| 7,197,326 | B2 | 3/2007 | Acampora |

(Continued)

FOREIGN PATENT DOCUMENTS

| | | |
|---|---|---|
| EP | 2042885 | 4/2009 |
| WO | WO2005062066 | 7/2005 |

(Continued)

OTHER PUBLICATIONS

International Search Report and Written Opinion for PCT Application No. PCT/US2010/049413, May 20, 2011.

(Continued)

*Primary Examiner* — Edwin Holloway, III
(74) *Attorney, Agent, or Firm* — DLA Piper LLP (US)

(57) ABSTRACT

A method and system for determining a real-time location of an object or person in a facility using low frequency magnetic induction positioning is disclosed herein. Each of the plurality of low frequency receivers is configured to receive a signal packet from a low-frequency magnetic induction transmitter, decode the signal packet, and estimate a distance from the low-frequency magnetic induction transmitter to the low-frequency receiver based on the decoded signal packet.

26 Claims, 14 Drawing Sheets

(56) References Cited

U.S. PATENT DOCUMENTS

| | | |
|---|---|---|
| 7,312,752 B2 | 12/2007 | Smith et al. |
| 7,324,824 B2 | 1/2008 | Smith et al. |
| 7,336,182 B1 | 2/2008 | Baranowski et al. |
| 7,471,200 B2 | 12/2008 | Otranen |
| 7,565,108 B2 | 7/2009 | Kotola et al. |
| 7,573,382 B2 | 8/2009 | Choubey et al. |
| 7,757,947 B2 | 7/2010 | Reznik et al. |
| 7,868,738 B2 | 1/2011 | Dasgupta et al. |
| 7,969,306 B2 | 6/2011 | Ebert et al. |
| 8,050,939 B2 | 11/2011 | Graves et al. |
| 8,320,932 B2 | 11/2012 | Pinder et al. |
| 2005/0021369 A1 | 1/2005 | Cohen et al. |
| 2006/0055552 A1 | 3/2006 | Chung et al. |
| 2006/0056363 A1 | 3/2006 | Ratiu et al. |
| 2007/0008108 A1 | 1/2007 | Schurig et al. |
| 2008/0012767 A1 | 1/2008 | Caliri et al. |
| 2008/0068267 A1 | 3/2008 | Huseth et al. |
| 2008/0074270 A1* | 3/2008 | Ashwood-Smith et al. .......... 340/572.7 |
| 2008/0081608 A1 | 4/2008 | Findikli et al. |
| 2008/0133127 A1 | 6/2008 | Havens |
| 2008/0189170 A1 | 8/2008 | Ramachandra |
| 2008/0221924 A1 | 9/2008 | Ilkin |
| 2009/0069642 A1 | 3/2009 | Gao et al. |
| 2009/0081951 A1 | 3/2009 | Erdmann et al. |
| 2009/0099862 A1 | 4/2009 | Fireman et al. |
| 2009/0224868 A1 | 9/2009 | Liu et al. |
| 2011/0125524 A1 | 5/2011 | Tenarvitz et al. |
| 2011/0191279 A1 | 8/2011 | Kim et al. |
| 2011/0276338 A1 | 11/2011 | Warner et al. |

FOREIGN PATENT DOCUMENTS

| | | |
|---|---|---|
| WO | WO2009045085 | 4/2009 |
| WO | WO2009066951 | 5/2009 |

OTHER PUBLICATIONS

Intl. Search Report and Written Report for PCT/US2013/039614 filed May 6, 2013.

* cited by examiner

LOW FREQUENCY MAGNETIC INDUCTION POSITIONING SYSTEM AND METHOD

CROSS REFERENCE TO RELATED APPLICATION

The present application claims priority to U.S. Provisional Patent Application No. 61/644,418, filed May 8, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a system and method for determining a real-time location of an object utilizing low frequency magnetic induction positioning.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives, the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects each of which transmits a signal, multiple receivers for receiving the transmissions from the tagged objects, and a processing means for analyzing the transmissions to determine the locations of the tagged objects within a predetermined environment. The tags can also receive signals.

Several prior art references discloses various tracking systems.

McKee et al., U.S. Pat. No. 6,915,135 discloses a system for determining presence, identity and duration of presence in a given area (a table in a restaurant) of an object (tag attached to a waiter).

Lester, U.S. Pat. No. 3,805,265 discloses a location system that uses line-of-sight radiant wave energy for signal transmission.

Schwengler U.S. Pat. No. 7,050,819, is directed at the problem of adequate power for a mobile telephone for a two-way communication function or a regeneration function as a node of a mesh network.

Christ, U.S. Pat. No. 5,977,913, discloses a radiofrequency system that is utilized within a prison and allows for an individual to be located after an alarm is triggered by the individual.

Zodnik, U.S. Patent Publication Number 2004/0147232, discloses wall-mounted (RJ-11 or RJ-45) wireless transceivers configured to only track the location of a self-identified wireless communication device in order to communicate the location of the self-identified wireless communication device to an emergency service such as 911.

One exemplary method triangulates the strongest received signals to determine the location of a tagged object. This method is based on the assumption that the receivers with the strongest received signals are the ones located closest to the tagged object. However, such an assumption is sometimes erroneous due to common environmental obstacles. Multipath effects can result in a further located receiver having a stronger received signal from a tagged object than a more proximate receiver to the tagged object, which can result in a mistaken location determination. The prior art has disclosed various means for overcoming multipath effects.

Tekinay, U.S. Pat. No. 6,259,894 for a Method For Improved Line-Of-Sight Signal Detection Using RF Model Parameters, discloses a method for reducing time-shift due to multipathing for a RF signal in an RF environment.

Close, U.S. Pat. No. 3,869,673 for a Method And Apparatus For Measuring Multipath Distortion, discloses a method for indicating multipath distortion in a received signal.

Lennen, U.S. Pat. No. 5,402,450 for a Signal Timing Synchronizer, discloses a method and apparatus for reducing the effects of multipath induced distortions on the accuracy of detecting the time of arrival of a received signal.

Fortune et al., U.S. Pat. No. 5,450,615 for a Prediction Of Indoor Electromagnetic Wave Propagation For Wireless Indoor Systems, discloses techniques for predicting RF propagation within a structure.

Other prior art references have disclosed the use of varying energy levels. For instance, Nakanishi, U.S. Pat. No. 5,451,847 for a Variable Energy Radio Frequency Quadrupole Linac discloses changing radio frequency energy levels to emitted focused and accelerated beams.

Kaewell, Jr. et al., U.S. Pat. No. 7,082,286 for a Path Searcher Using Reconfigurable Correlator Sets discloses producing a path profile for a user based on sorted output energy levels.

Fernabdez-Cobaton et al., U.S. Pat. No. 6,697,417 for a System And Method Of Estimating Earliest Arrival Of CDMA Forward And Reverse Link Signals discloses a mobile station receiver that detects the arrival times and energy levels of received signals, and constructs a searcher histogram and a finger histogram associated with each pilot signal.

There is a need for improved real-time tracking of objects and persons in a facility.

BRIEF SUMMARY OF THE INVENTION

The present invention determines a real-time location of an object in a facility using low frequency magnetic induction positioning.

One aspect of the present invention is a method for determining a real-time location of an object within a facility. The method includes transmitting a signal packet from at least one low-frequency magnetic induction transmitter of a plurality of low-frequency magnetic induction transmitters. Each of the plurality of low-frequency magnetic induction transmitters comprising at least one orthogonally oriented transmit coil. The signal packet comprises a unique transmitter identifier code and a coil orientation code. The method also includes receiving the signal packet at at least one low-frequency receiver. The method also includes decoding the signal packet at the at least one low-frequency receiver to generate decoded signal packet data. The method also includes estimating a distance from the at least one low-frequency magnetic induction transmitter to the at least one low-frequency receiver based on the decoded signal packet data.

Preferably estimating the distance comprises combining a received signal strength intensity for the signal packet and the coil orientation code to remove the effects of relative coil orientation and estimating a position of the at least one low-frequency receiver. Preferably, estimating the distance comprises utilizing a link intensity estimate.

Optionally, the method includes transmitting a signal from the at least one low-frequency receiver to a mesh network, the mesh network comprising a plurality of sensors within a facility.

The method further includes sending distance information to a processor, wherein the processor determines a location of an object. The processor is preferably a context aware location engine. The distance drives a workflow in the facility. The estimated distance provides context for at least one of an interaction, a workflow milestone and a departure. The at least one low-frequency magnetic induction transmitter comprises at least one of radiofrequency transmitter, an ultrasound transmitter and an infrared transmitter. The at least one low-frequency magnetic induction transmitter comprises a WiFi transmitter, a BLUETOOTH transmitter and a ZIGBEE transmitter.

Another aspect of the present invention is a system for determining a real-time location of an object within a facility. The system includes a plurality of low-frequency magnetic induction transmitters, and a plurality of low-frequency receivers. Each of the plurality of low-frequency magnetic induction transmitters comprises at least one orthogonally oriented transmit coil. Each of the plurality of low-frequency magnetic induction transmitters is configured to transmit a signal packet comprising a unique transmitter identifier code and a coil orientation code. Each of the plurality of low frequency receivers is configured to receive the signal packet, decode the signal packet, and estimate a distance from the low-frequency magnetic induction transmitter to the low-frequency receiver based on the decoded signal packet.

Preferably, each of the plurality of low-frequency magnetic induction transmitters is configured to drive each coil with multiple power levels; each plurality of low-frequency receivers is configured to determine an effective signal strength by correlating a number of signal packets received from each transmit coil with a corresponding power level of each of the plurality of low-frequency magnetic induction transmitters; and a resulting value is a threshold for reception and is related to an effective RSSI.

Preferably, each of the plurality of low-frequency magnetic induction transmitters is configured to encode both a unique device code and a transmit power level indication, and each plurality of low-frequency receivers is configured to estimate a link strength using the lowest power level indication code received from a particular low-frequency magnetic induction transmitter of the plurality of low-frequency magnetic induction transmitters.

Preferably, the receiver has a variable gain amplifier and automatic gain control to automatically adjust a gain to maintain a constant output level, and an adjusted gain level is inversely proportional to the received signal strength and is used for RSSI calculation.

Preferably, the combination of two or more signal packets received from two or more transmitter orientations located at a common point are combined in vector magnitude form to produce an orientation invariant signal strength.

Preferably, each of the plurality of low-frequency magnetic induction transmitters synchronizes the signal packet transmissions to reduce over-the-air collisions.

Preferably, each of the plurality of low-frequency magnetic induction transmitters uses motion activation to trigger signal packet transmissions by each of the plurality of low-frequency magnetic induction transmitters in an area.

The system optionally includes a plurality of sensors positioned within a facility that forms a mesh network.

The system optionally includes at least one position engine in communication with the mesh network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
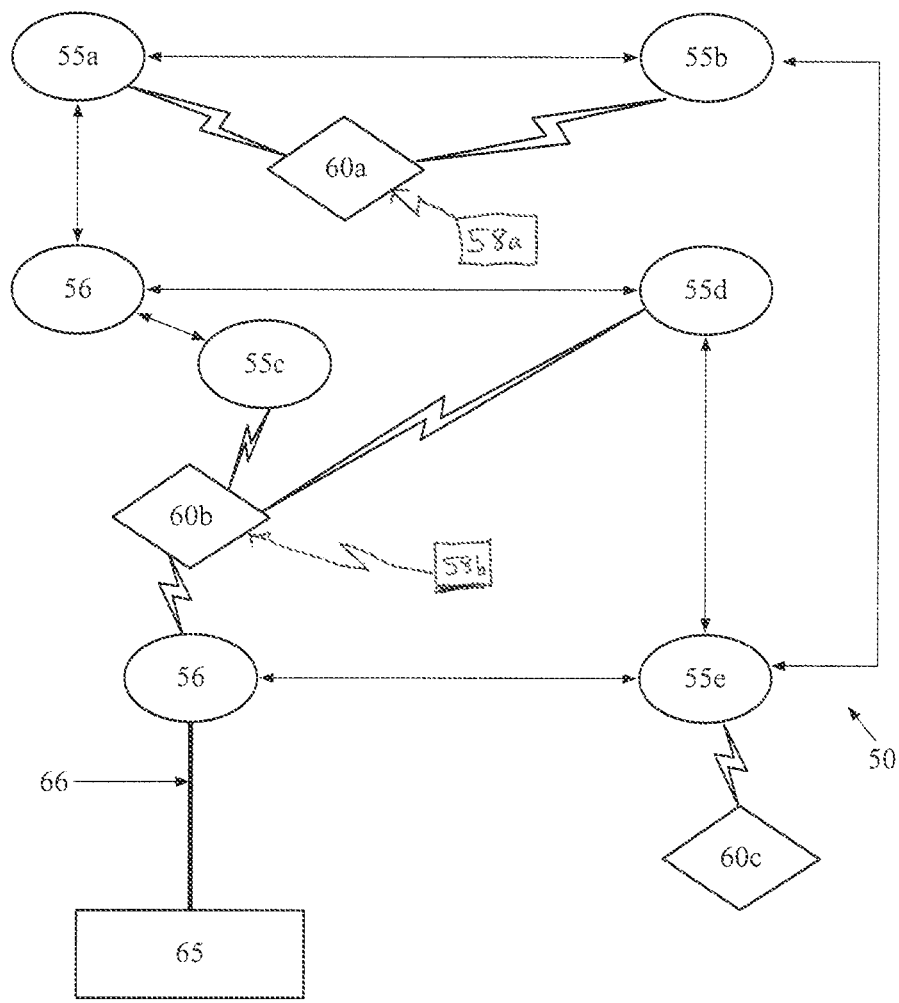
FIG. 1 is schematic view of a system for determining a real-time location of an object or person within a facility utilizing low frequency magnetic induction positioning.
Figure 2:
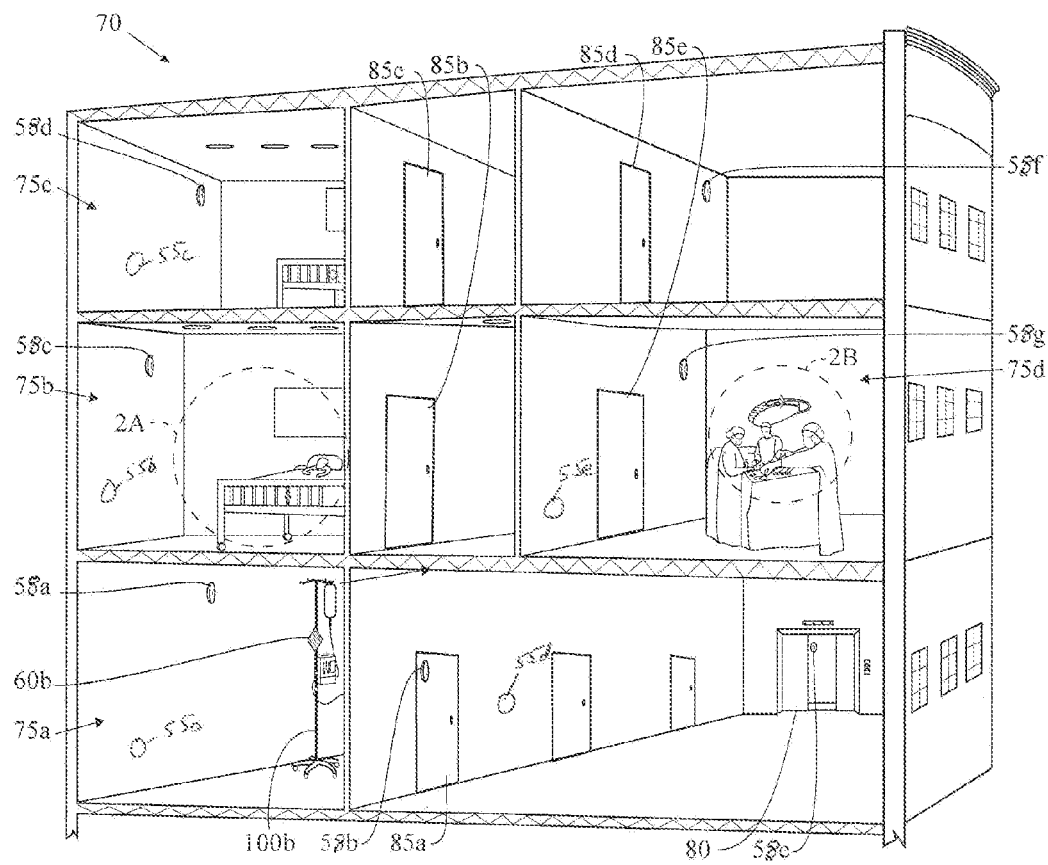
FIG. 2 is a multi-floor view of a facility employing a system determining a real-time location of an object or person within a facility utilizing low frequency magnetic induction positioning.
Figure 2A:
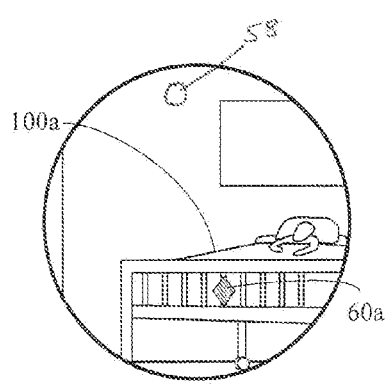
FIG. 2A is an isolated enlarged view of circle 2A of FIG. 2.
Figure 2B:
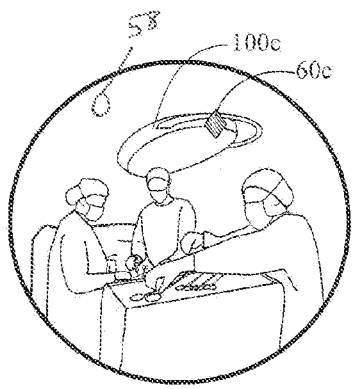
FIG. 2B is an isolated enlarged view of circle 2B of FIG. 2.
Figure 3:
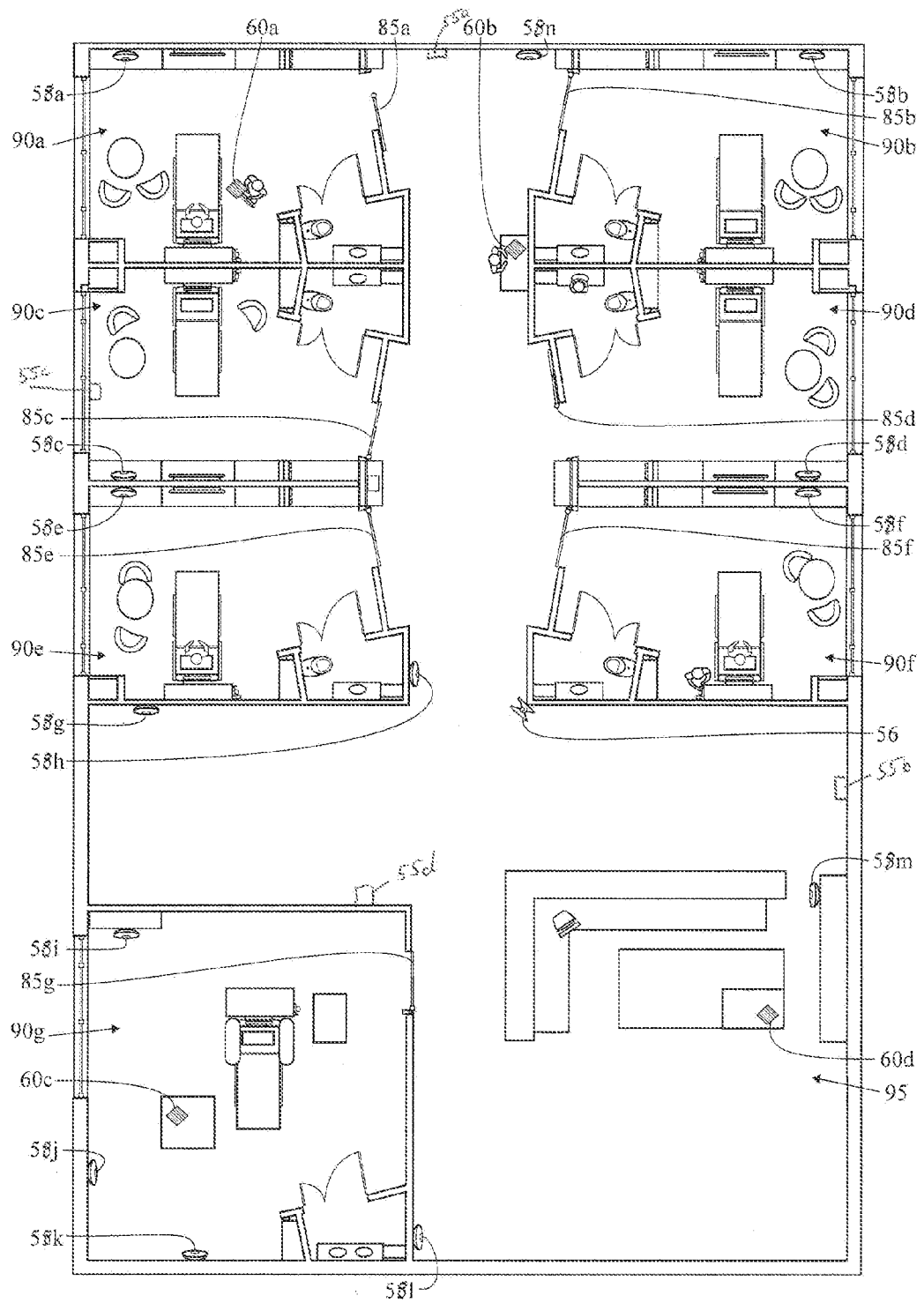
FIG. 3 is a floor plan view of a single floor in a facility employing a system for determining a real-time location of an object or person within a facility utilizing low frequency magnetic induction positioning.

As shown in FIGS. 1, 2, 2A, 2B, 3 and 4, a system for tracking objects and persons within a facility is generally designated 50. The system 50 is capable of determining a real-time location of an object 100 within a facility 70. The system 50 preferably includes a plurality of sensors 55, a plurality of bridges 56, a plurality of low-frequency magnetic induction transmitters 58, a plurality of low-frequency receivers 60 and at least one processing engine 65 which includes a processor for calculating the real-time location of objects within the facility 70 utilizing information provided by the sensors 55. One example of the components of the system 50 is disclosed in U.S. Pat. No. 7,197,326, for a Wireless Position Location And Tracking System, which is hereby incorporated by reference in its entirety. A more specific example of the sensors 55 is disclosed in U.S. Pat. No. 7,324,824, for a Plug-In Network Appliance, which is hereby incorporated by reference in its entirety.

Each of the plurality of low-frequency magnetic induction transmitters 58 comprises at least one orthogonally oriented transmit coil. Each of the plurality of low-frequency magnetic induction transmitters 58 is configured to transmit a signal packet comprising a unique transmitter identifier code and a coil orientation code. Each of the low frequency receivers 60 is configured to receive the signal packet, decode the signal packet, and estimate a distance from the low-frequency magnetic induction transmitter 58 to the low-frequency receiver 60 based on the decoded signal packet.

The system 50 is preferably employed at a facility 70 such as a business office, factory, home, hospital and/or government agency building. The system 50 is utilized to track and locate various objects and/or persons positioned throughout the facility 70. A low-frequency receiver 60 is attached to an object 100 or person 159. The low-frequency receivers 60 preferably continuously receive signals transmitted by the low-frequency magnetic induction transmitters 58 positioned throughout the facility 70. Alternatively, the low-frequency receivers 60 also transmit signals received by the sensors 55 positioned throughout the facility 70. The sensors 55 transmit the data to a bridge 56 for transmission to a processing engine 65. If a sensor 55 is unable to transmit to a bridge 56, the sensor 55 may transmit to another sensor 55 in a mesh network-like system for eventual transmission to a bridge 56. In a preferred embodiment, a transmission is sent from a transmission distance of six sensors 55 from a bridge 56. Alternatively, a transmission is sent from a transmission distance ranging from ten to twenty sensors 55 from a bridge 56. The processing engine 65 preferably continuously receives transmissions from the sensors 55 via the bridges 56 concerning the movement of objects 100 bearing a low-frequency receiver 60 within the facility 70. The processing engine 65 processes the transmissions from the sensors 55 and calculates a real-time position for each of the objects 100 or persons 159 bearing a low-frequency receiver 60 within the facility 70 utilizing multiple location algorithms. The real-time location information for each of the objects 100 or persons 159 bearing a low-frequency receiver 60 is preferably displayed on an image of a floor plan of the facility 70, or if the facility 70 has multiple floors, then on the floor plan images of the floors of the facility 70. The floor plan image may be used with a graphical user interface of a computer, personal digital assistant, or the like so that an individual of the facility 70 is able to quickly locate objects 100 or persons 159 bearing a low-frequency receiver 60 within the facility 70.

As shown in FIG. 1, the system 50 utilizes sensors 55 to monitor and identify the real-time position of non-stationary objects 100 or persons 159 bearing or integrated with low frequency receivers 60. The sensors 55a-f preferably form a mesh network and wirelessly communicate with each other (shown as double arrow lines) and with at least one processing engine 65, preferably through a wired connection 66 via at least one bridge 56, such as disclosed in the above-mentioned U.S. Pat. No. 7,324,824 for a Plug-In Network Appliance. The processing engine(s) 65 is/are preferably located on-site at the facility 70. However, the system 50 may also include an off-site processing engine(s) 65, not shown. Those skilled in the pertinent art will recognize that a single server may include more than one locating engine 65.

As shown in FIGS. 2, 2A, 2B, 3 and 4, the facility 70 is depicted as a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility are low-frequency magnetic induction transmitters 58 which transmit beacon signals which are received by the low-frequency receivers 60. Also positioned throughout the facility 70 are sensors 55a-o for obtaining readings from low frequency receivers 60a-d, which are attached to or integrated into non-stationary objects 100a, 100b (see FIGS. 2 and 4). A bridge 56 is also shown for receiving transmissions from the sensors 55 for processing by the central processor 65. The sensor 55 may have an antenna architecture such as disclosed in U.S. patent application Ser. No. 12/554,814 for Antenna Diversity For Wireless Tracking System And Method, which is hereby incorporated by reference in its entirety.

Figure 4:
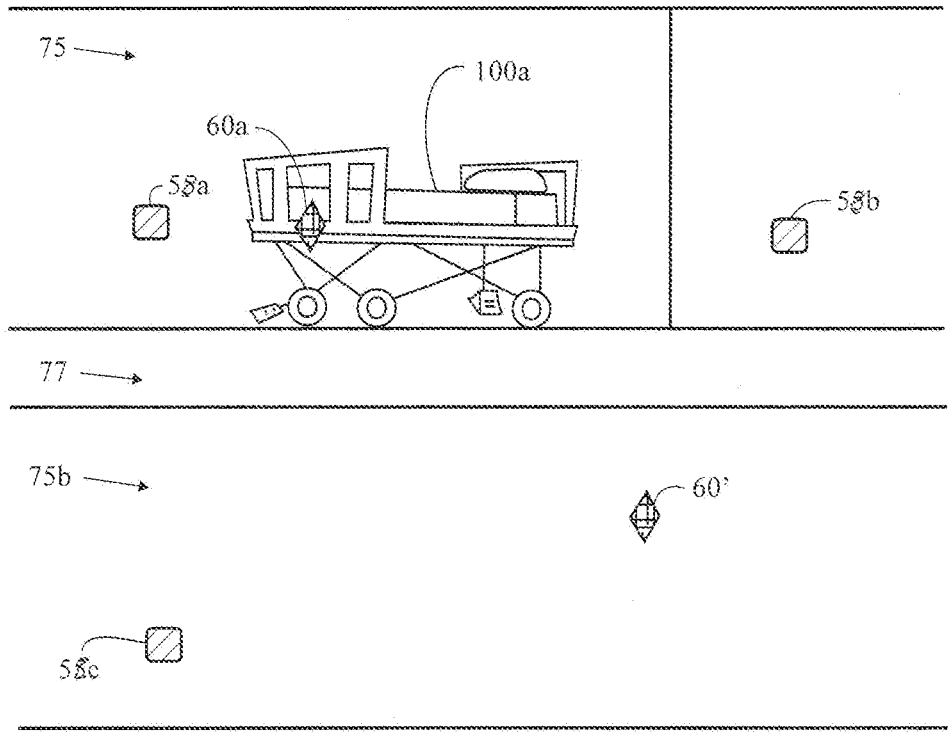
FIG. 4 is a two-floor view of a facility including low frequency receivers and low-frequency magnetic induction transmitter of a system for determining a real-time location of an object or person within a facility utilizing low frequency magnetic induction positioning.

As shown in FIG. 4, the low frequency receiver 60a is attached to movable bed 100a positioned on an upper floor 75c. The low frequency receiver 60a transmits a signal which is received by sensors 55a, 55b and 55c. If the signal to the sensor 55c is the strongest, then an analysis of the readings from the sensors 55a-c may place the low frequency receiver 60a, and thus the movable bed 100a, at position 60' on the lower floor 75b. This type of faulty reading would likely occur with triangulation. To prevent such a faulty positioning reading, the present invention processes the readings preferably according to a method which eliminates the reading from sensor 55c from the location calculation for movable bed 100a.

Figure 5:
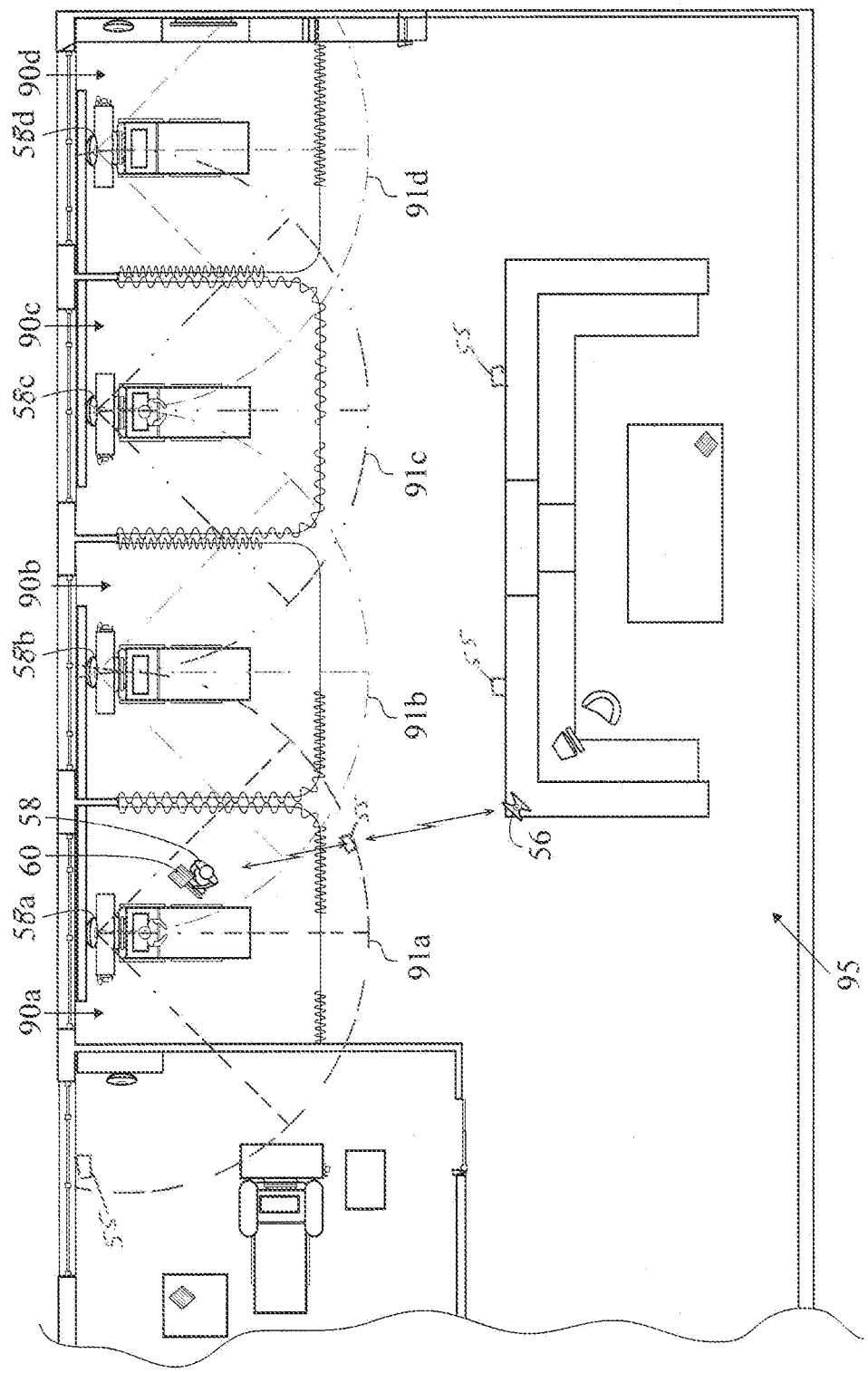
FIG. 5 floor plan view of emergency room bays in a hospital employing the system for determining a real-time location of an object or person within a facility utilizing low frequency magnetic induction positioning.
Figure 6:
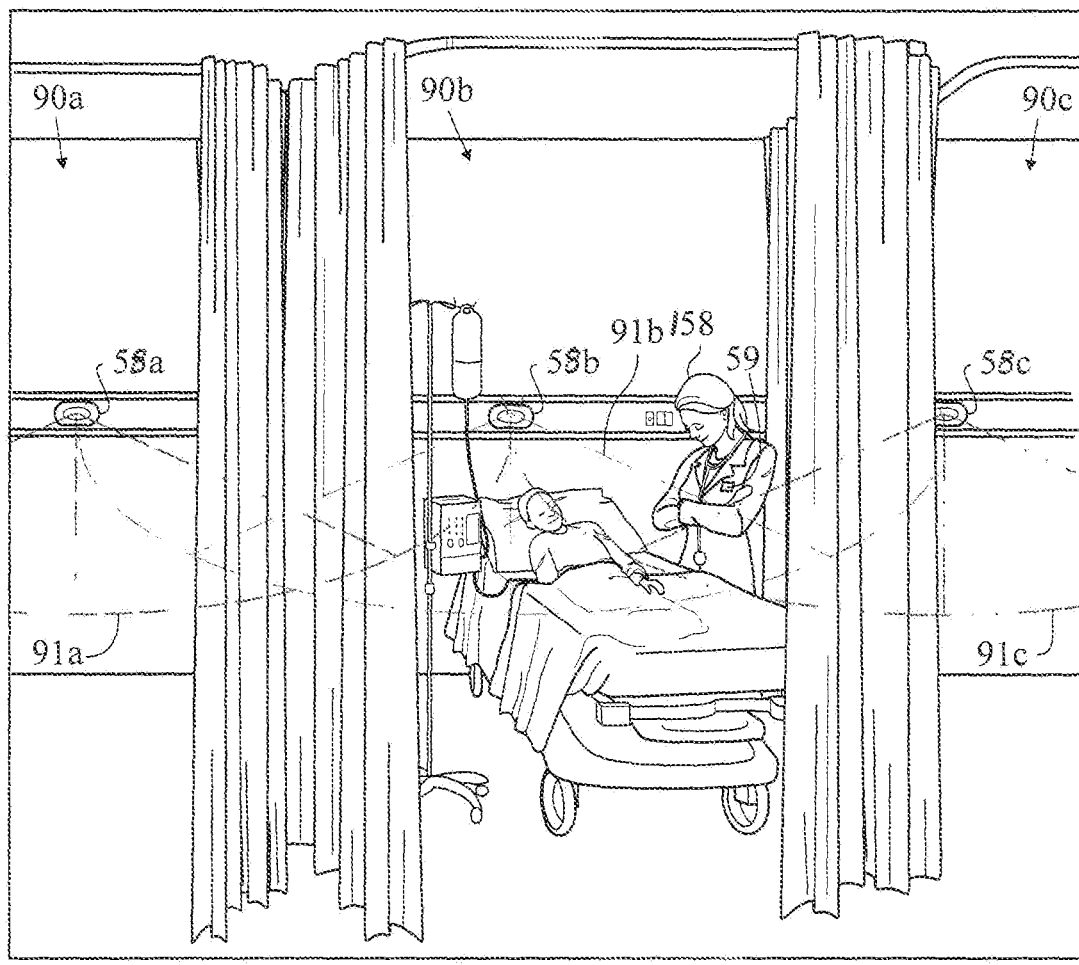
FIG. 6 is an illustration of an emergency room bay equipped with a system for determining a real-time location of an object or person within a facility utilizing low frequency magnetic induction positioning.

An emergency room 95 of a hospital is shown in FIGS. 5 and 6. The emergency room 95 has multiple bays 90a-d for treating patients. Curtains usually separate the bays 90 from each other. Each bay 90 preferably has a low-frequency magnetic induction transmitter 58a-58d, which preferably transmits a beacon on a low power short-range wireless communication format, typically within a ten foot range. Thus, some of the beacon signals overlap adjacent bays 90. For example, the beacon transmitted from beacon transmitter 58a extends into bay 90a and into bay 90b. A low frequency receiver 59 worn by a physician 158 in bay 90b will most likely receive beacon transmission from the low-frequency magnetic induction transmitter 58b, the low-frequency magnetic induction transmitter 58a in bay 90a and the low-frequency magnetic induction transmitter 58c in bay 90c.

A description tracking systems is found in Caliri et al., U.S. Pat. No. 7,636,046 for Wireless Tracking System And Method With Extreme Temperature Resistant Tag, which is hereby incorporated by reference in its entirety. Another description of a tracking system is found in Perkins et al., U.S. Pat. No. 7,701,334 for Wireless Tracking System And Method For Sterilizable Object, which is hereby incorporated by reference in its entirety. Another description of a tracking system using tags is found in Hertlein et al., U.S. patent application Ser. No. 13/371,416, filed on Feb. 11, 2012, for Sterilizable Wireless Tracking And Communication Device And Method For Manufacturing, which is hereby incorporated by reference in its entirety. In another embodiment, the wireless communication devices, are used with or as near-field communication devices such as disclosed in Perkins, U.S. Pat. No. 7,941,096 for Wireless Tracking System And Method Utilizing Near-Field Communication Devices, which is hereby incorporated by reference in its entirety. In another embodiment, the wireless communication devices, are used with or as back-hauling communication devices such as disclosed in Perkins, U.S. Pat. No. 8,040,238 for Wireless Tracking System And Method For Backhaul Of Information, which is hereby incorporated by reference in its entirety. The present invention may utilize location algorithms such as disclosed in Perkins, U.S. patent application Ser. No. 13/244,257, for a Wireless Tracking System And Method Utilizing Variable Location Algorithms, filed on Sep. 23, 2011, which is hereby incorporated by reference in its entirety. The present invention may be utilized with peer-to-peer interactions and workflow such as disclosed in Perkins, U.S. Pat. No. 8,285,564 for a Wireless Tracking System And Method For Analyzing An Interaction Between Objects, which is hereby incorporated by reference in its entirety.

The method and system for determining a real-time location of an object or person in a facility using low frequency magnetic induction positioning can be utilized with multiple location algorithms. The first location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The second location algorithm is preferably one of a proximity algorithm, a radial basis function algorithm, a maximum likelihood algorithm, a genetic algorithm, a minimum mean squared error algorithm, a radiofrequency fingerprinting algorithm, a multilateration algorithm, a time difference of arrival algorithm, a signal strength algorithm, a time of arrival algorithm, an angle of arrival algorithm, a spatial diversity algorithm, and a nearest neighbor algorithm. The wireless signal is preferably one of light, radiofrequency, sound and magnetic energy. The first location algorithm or the second location algorithm is alternatively at least one of a voting algorithm, an averaging algorithm and a confidence algorithm.

Figure 7:
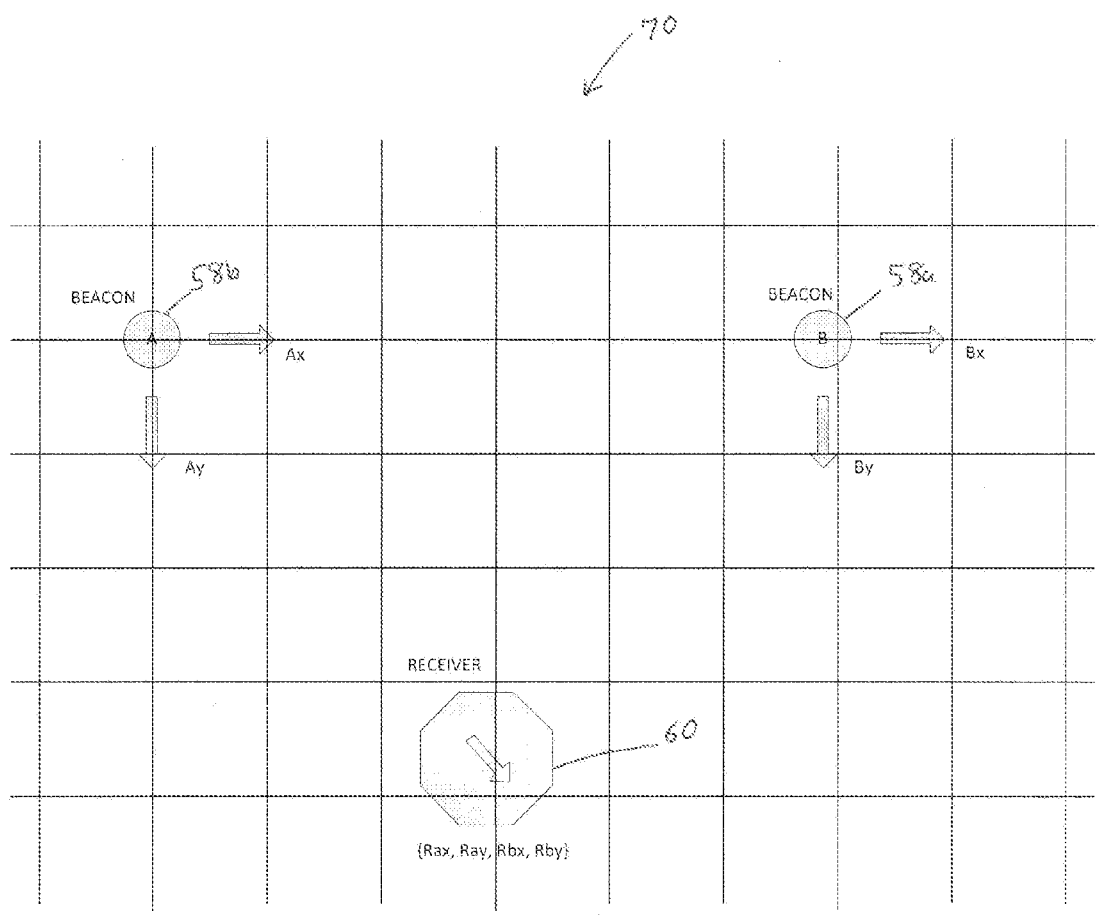
FIG. 7 is a block diagram of a system for determining a real-time location of an object or person within a facility utilizing low frequency magnetic induction positioning.

As shown in FIG. 7, a system for utilizing low frequency magnetic induction positioning includes multiple low frequency magnetic induction beacons 58 and multiple low frequency magnetic induction receivers 60. The beacons 58 transmit a signal packet that comprises a unique transmitter identifier code and a coil orientation code. The receivers 60, receive the signal packet, decode it and estimate a distance from the receiver to the beacon that sent the transmission. Preferably, the receiver 60 has a variable gain amplifier and automatic gain control to automatically adjust a gain to maintain a constant output level, and an adjusted gain level is inversely proportional to the received signal strength and is used for RSSI calculation.

Preferably, the combination of two or more signal packets received from two or more beacon orientations located at a common point are combined in vector magnitude form to produce an orientation invariant signal strength. Preferably, each of the low-frequency magnetic induction beacons 58 synchronizes the signal packet transmissions to reduce over-the-air collisions. Preferably, each of the low-frequency magnetic induction beacons 58 uses motion activation to trigger signal packet transmissions by each of the low-frequency magnetic induction beacons in an area. Preferably, each of the low-frequency magnetic induction beacons 58 is configured to drive each coil with multiple power levels. Preferably, each of the low-frequency receivers 60 is configured to determine an effective signal strength by correlating a number of signal packets received from each transmit coil with a corresponding power level of each of the low-frequency magnetic induction beacons 58 and a resulting value is a threshold for reception and is related to an effective RSSI. Preferably, each of the low-frequency magnetic induction beacons 58 is configured to encode both a unique device code and a transmit power level indication, and each of the low-frequency receivers 60 is configured to estimate a link strength using the lowest power level indication code received from a particular low-frequency magnetic induction beacon 58.

As discussed above in reference in to FIGS. 1, 2, 3, 4, 5 and 6, the low frequency receiver 60 is attached to a moveable object 100 or person 158, and the low-frequency magnetic induction transmitters 58 are fixed in a specific location of the facility 70. However, in an alternative embodiment, each of the low-frequency magnetic induction transmitters 58 is attached to a moveable object 100 or person 158, and each of the low frequency receivers 60 is fixed in a specific location of the facility 70. In this embodiment, in reference to the FIGS. 1, 2, 3, 4, 5 and 6, the low-frequency magnetic induction transmitters 58 would take the place of the low frequency receivers 60, and the low frequency receivers 60 would take the place of the low-frequency magnetic induction transmitters 58.

In yet a different embodiment, both the low-frequency magnetic induction transmitters 58 and the low frequency receivers 60 are attached to moveable objects 100 or persons 158.

In any or all of the three embodiments, at least one or both of the low-frequency magnetic induction transmitters 58 and the low frequency receivers 60 communicate with the plurality of sensors 55, using a low-frequency communication protocol or a medium frequency communication protocol.

Figure 8:
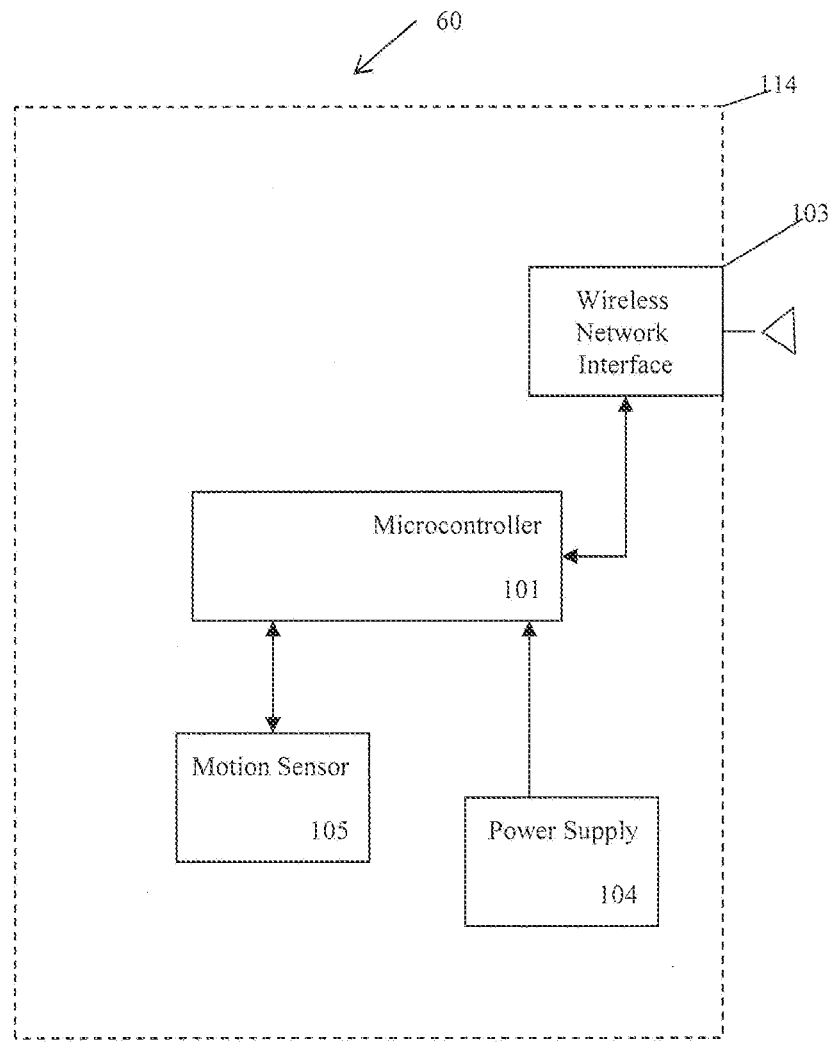
FIG. 8 is a block diagram of a low frequency receiver utilizing radiofrequency.

A low frequency receiver 60 that receives radiofrequency signals is illustrated in FIG. 8. A microcontroller 101 has programmed software to receive a signal packet from a low-frequency magnetic induction transmitter, decode the signal packet, and estimate a distance from the low-frequency magnetic induction transmitter to the low-frequency receiver based on the decoded signal packet. The transmissions are received through transceiver (wireless network interface) 103. A power supply 104 provides power to the low frequency receiver 60. All of the components are preferably contained within a housing 114. The low frequency receiver 60 may also have a motion sensor 105 for sensing motion of an object 100 or person to which the low frequency receiver 60 is attached. The low frequency receiver 60 alternatively also operates at a communication format that preferably includes WiFi and ZIGBEE. Those skilled in the pertinent art will recognize that other communication formats may be used with departing from the scope and spirit of the present invention. The communication format also allows the low frequency receiver 60 to communicate with the sensors 55 to transmit information.

Figure 9:
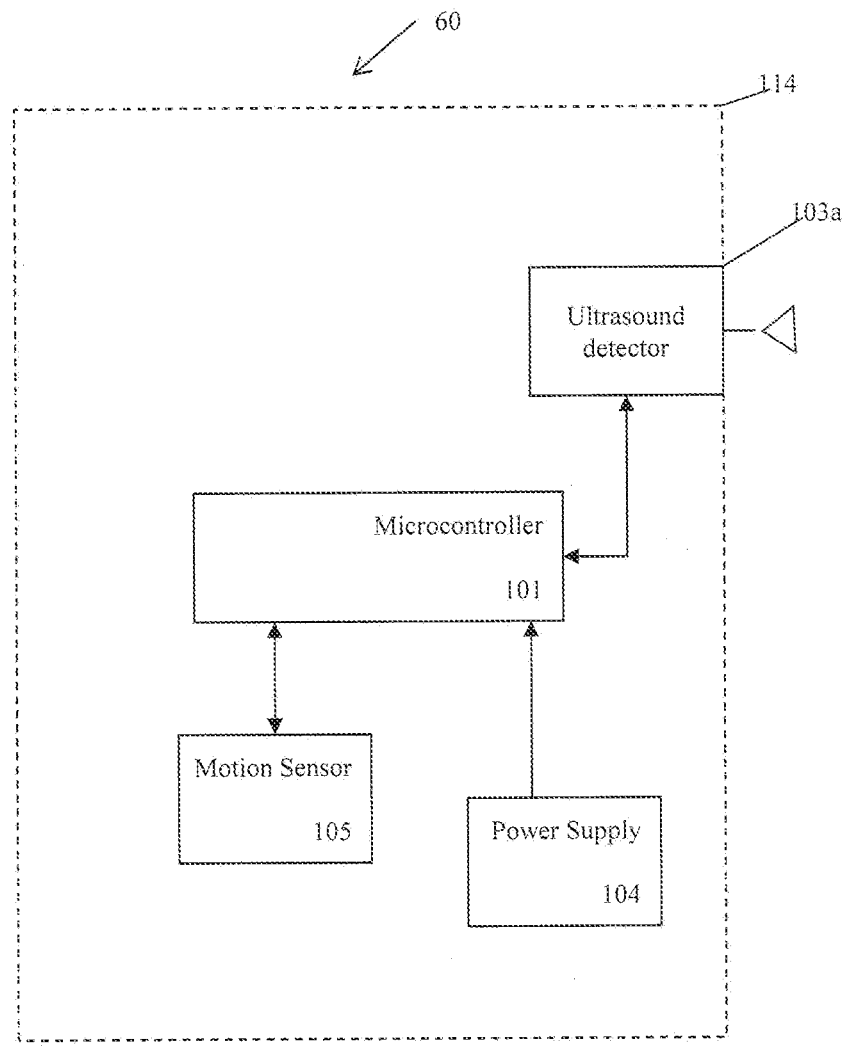
FIG. 9 is a block diagram of a low frequency receiver utilizing ultrasound.

A low frequency receiver 60 that receives ultrasound signals is illustrated in FIG. 9. A microcontroller 101 has programmed software to receive a signal packet from a low-frequency magnetic induction transmitter, decode the signal packet, and estimate a distance from the low-frequency magnetic induction transmitter to the low-frequency receiver based on the decoded signal packet. The transmissions are received through transceiver (ultrasound detector) 103a. A power supply 104 provides power to the low frequency receiver 60. All of the components are preferably contained within a housing 114. The low frequency receiver 60 may also have a motion sensor 105 for sensing motion of an object 100 or person to which the low frequency receiver 60 is attached. The low frequency receiver 60 alternatively also operates at a communication format that preferably includes WiFi and ZIGBEE. Those skilled in the pertinent art will recognize that other communication formats may be used with departing from the scope and spirit of the present invention. The communication format also allows the low frequency receiver 60 to communicate with the sensors 55 to transmit information to a processing engine 65.

Figure 10:
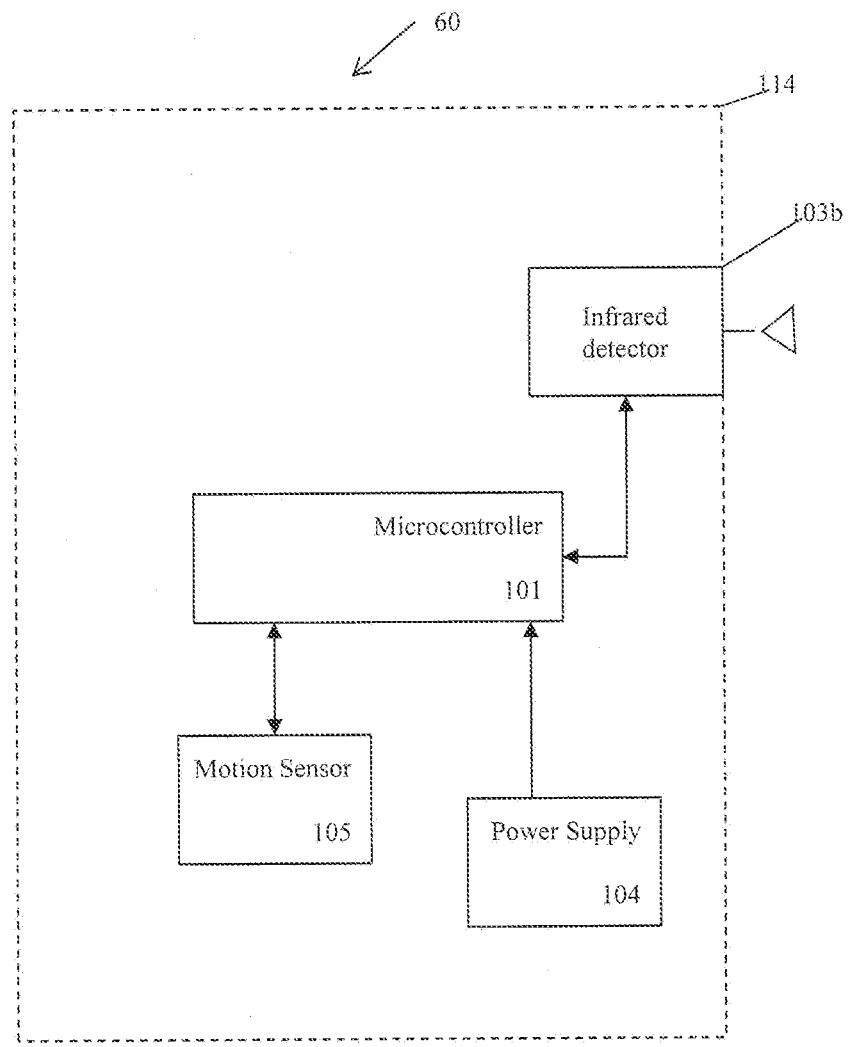
FIG. 10 is a block diagram of a low frequency receiver utilizing infrared.

A low frequency receiver 60 that receives infrared signals is illustrated in FIG. 10. A microcontroller 101 has programmed software to receive a signal packet from a low-frequency magnetic induction transmitter, decode the signal packet, and estimate a distance from the low-frequency magnetic induction transmitter to the low-frequency receiver based on the decoded signal packet. The transmissions are received through transceiver (infrared photodetector) 103b. A power supply 104 provides power to the low frequency receiver 60. All of the components are preferably contained within a housing 114. The low frequency receiver 60 may also have a motion sensor 105 for sensing motion of an object 100 or person to which the low frequency receiver 60 is attached. The low frequency receiver 60 alternatively also operates at a communication format that preferably includes WiFi and ZIGBEE. Those skilled in the pertinent art will recognize that other communication formats may be used with departing from the scope and spirit of the present invention. The communication format also allows the low frequency receiver 60 to communicate with the sensors 55 to transmit information to a processing engine 65.

Figure 11:
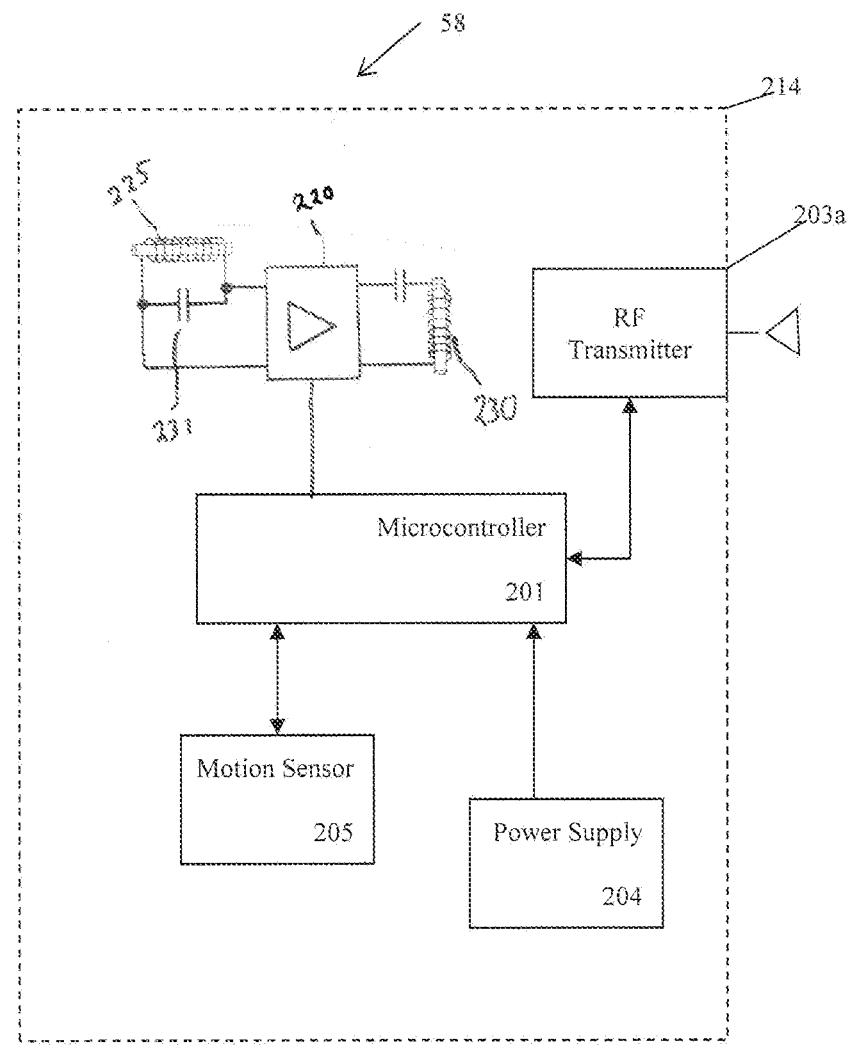
FIG. 11 is a block diagram of a low-frequency magnetic induction transmitter utilizing radiofrequency.

One embodiment of a low-frequency magnetic induction transmitter 58 that transmits radiofrequency signals is illustrated in FIG. 11. The low-frequency magnetic induction transmitter 58 preferably comprises a microcontroller 201, a radiofrequency transmitter 203, a power supply 204, a motion sensor 205, an amplifier 220, a first coil 225 and a second coil 230 orthogonal to each other, and a capacitor 231. The low-frequency magnetic induction transmitter 58 is configured to transmit a signal packet comprising a unique transmitter identifier code and a coil orientation code. The transmissions are sent through the transceiver (RF transmitter) 203. The power supply 204 provides power to the low-frequency magnetic induction transmitter 58. All of the components are preferably contained within a housing 214. The low-frequency magnetic induction transmitter 58 may also have a motion sensor 205 for sensing motion of an object 100 or person to which the low-frequency magnetic induction transmitter 58 is attached. The low-frequency magnetic induction transmitter 58 alternatively also operates at a communication format that preferably includes WiFi and ZIGBEE. Those skilled in the pertinent art will recognize that other communication formats may be used with departing from the scope and spirit of the present invention. The communication format also allows the low-frequency magnetic induction transmitter 58 to communicate with the sensors 55 to transmit information.

Figure 12:
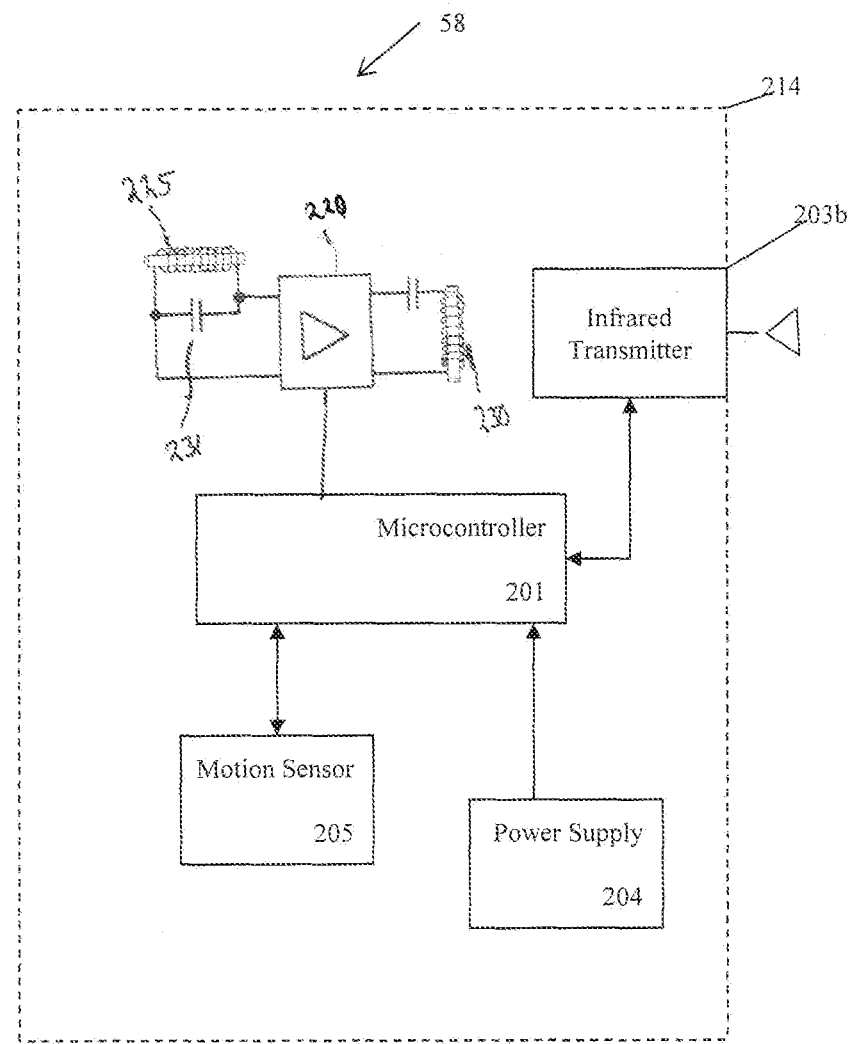
FIG. 12 is a block diagram of a low-frequency magnetic induction transmitter utilizing infrared.

One embodiment of a low-frequency magnetic induction transmitter 58 that transmits infrared signals is illustrated in FIG. 12. The low-frequency magnetic induction transmitter 58 comprises a microcontroller 201, an infrared transmitter 203, a power supply 204, a motion sensor 205, an amplifier 220, a first coil 225 and a second coil 230 orthogonal to each other, and a capacitor 231. The low-frequency magnetic induction transmitter 58 is configured to transmit a signal packet comprising a unique transmitter identifier code and a coil orientation code. The transmissions are sent through the transceiver (infrared transmitter) 203. The power supply 204 provides power to the low-frequency magnetic induction transmitter 58. All of the components are preferably contained within a housing 214. The low-frequency magnetic induction transmitter 58 may also have a motion sensor 205 for sensing motion of an object 100 or person to which the low-frequency magnetic induction transmitter 58 is attached. The low-frequency magnetic induction transmitter 58 alternatively also operates at a communication format that preferably includes WiFi and ZIGBEE. Those skilled in the pertinent art will recognize that other communication formats may be used with departing from the scope and spirit of the present invention. The communication format also allows the low-frequency magnetic induction transmitter 58 to communicate with the sensors 55 to transmit information.

Figure 13:
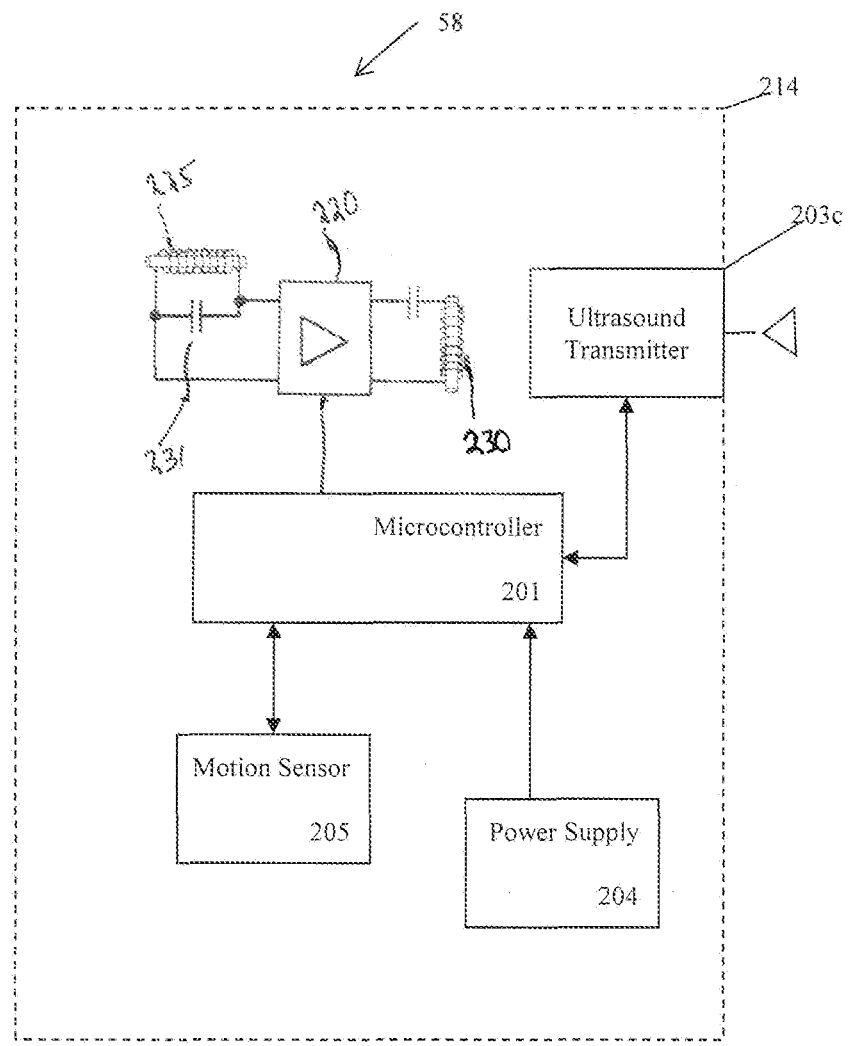
FIG. 13 is a block diagram of a low-frequency magnetic induction transmitter utilizing ultrasound.

One embodiment of a low-frequency magnetic induction transmitter 58 that transmits ultrasound signals is illustrated in FIG. 13. The low-frequency magnetic induction transmitter 58 comprises a microcontroller 201, a ultrasound transmitter 203, a power supply 204, a motion sensor 205, an amplifier 220, a first coil 225 and a second coil 230 orthogonal to each other, and a capacitor 231. The low-frequency magnetic induction transmitter 58 is configured to transmit a signal packet comprising a unique transmitter identifier code and a coil orientation code. The transmissions are sent through the transceiver (ultrasound transmitter) 203. The power supply 204 provides power to the low-frequency magnetic induction transmitter 58. All of the components are preferably contained within a housing 214. The low-frequency magnetic induction transmitter 58 may also have a motion sensor 205 for sensing motion of an object 100 or person to which the low-frequency magnetic induction transmitter 58 is attached. The low-frequency magnetic induction transmitter 58 alternatively also operates at a communication format that preferably includes WiFi and ZIGBEE. Those skilled in the pertinent art will recognize that other communication formats may be used with departing from the scope and spirit of the present invention. The communication format also allows the low-frequency magnetic induction transmitter 58 to communicate with the sensors 55 to transmit information.

Figure 14:
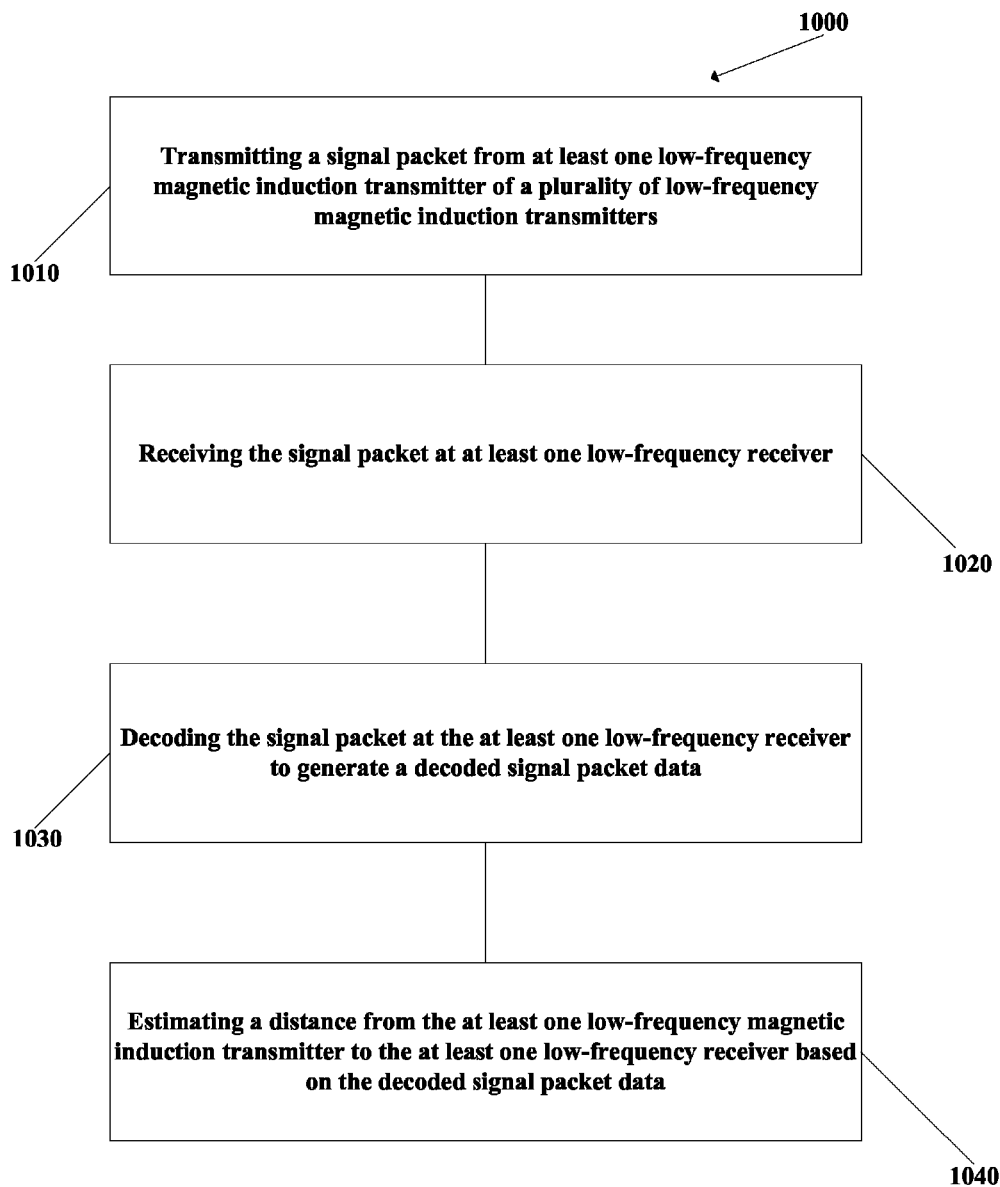
FIG. 14 is a flow chart of a method for determining a real-time location of an object or person within a facility utilizing low frequency magnetic induction positioning.

As shown in FIG. 14, a flow chart for a method for determining a real-time location of an object within a facility is generally designated 1000. At block 1010, a signal packet is transmitted from at least one low-frequency magnetic induction transmitter of a plurality of low-frequency magnetic induction transmitters. Each of the plurality of low-frequency magnetic induction transmitters comprises at least one orthogonally oriented transmit coil, the signal packet comprising a unique transmitter identifier code and a coil orientation code. At block 1020, the signal packet is received at at least one low-frequency receiver. At block 1030, the signal packet is decoded at the at least one low-frequency receiver to generate a decoded signal packet data. At block 1040, a distance from the at least one low-frequency magnetic induction transmitter to the at least one low-frequency receiver is estimated based on the decoded signal packet data. The method 1000 can further comprises sending distance information to a processor, wherein the processor determines a location of an object. The processor is preferably a context aware location engine.

The distance estimation of the method 1000 preferably drives workflow in a facility. The estimated distance preferably provides context for at least one of an interaction, a workflow milestone and a departure (discharge, death, transfer or the like). The at least one low-frequency magnetic induction transmitter preferably comprises at least one of a radiofrequency transmitter, an ultrasound transmitter and an infrared transmitter. The at least one low-frequency magnetic induction transmitter comprises a WiFi transmitter, a BLUETOOTH transmitter and a ZIGBEE transmitter.

The step of estimating the distance preferably comprises combining a received signal strength intensity for the signal packet and the coil orientation code to remove the effects of relative coil orientation; and estimating a position of the at least one low-frequency receiver 60. Alternatively, the step of estimating the distance comprises utilizing a link intensity estimate.

The method further comprises transmitting a signal from the at least one low-frequency receiver 60 to a mesh network, the mesh network comprising a plurality of sensors 55 within a facility 70.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for determining a real-time location of an object within a facility, the method comprising:
   transmitting a signal packet from at least one low-frequency magnetic induction transmitter of a plurality of low-frequency magnetic induction transmitters, each of the plurality of low-frequency magnetic induction transmitters comprising at least one orthogonally oriented transmit coil, the signal packet comprising a unique transmitter identifier code and a coil orientation code;
   receiving the signal packet at at least one low-frequency receiver;
   decoding the signal packet at the at least one low-frequency receiver to generate a decoded signal packet data; and
   estimating a distance from the at least one low-frequency magnetic induction transmitter to the at least one low-frequency receiver based on the decoded signal packet data.

2. The method according to claim 1 further comprising sending distance information to a processor, wherein the processor determines a location of an object.

3. The method according to claim 2 wherein the processor is a context aware location engine.

4. The method according to claim 1 wherein the distance drives a workflow.

5. The method according to claim 1 wherein the estimated distance provides context for at least one of an interaction, a workflow milestone and a departure.

6. The method according to claim 1 wherein the at least one low-frequency magnetic induction transmitter comprises at least one of a radiofrequency transmitter, an ultrasound transmitter and an infrared transmitter.

7. The method according to claim 1 wherein the at least one low-frequency magnetic induction transmitter comprises a WiFi transmitter, a BLUETOOTH transmitter and a ZIGBEE transmitter.

8. The method according to claim 1 wherein the estimating the distance comprises combining a received signal strength intensity for the signal packet and the coil orientation code to remove the effects of relative coil orientation; and estimating a position of the at least one low-frequency receiver.

9. The method according to claim 1 wherein the estimating the distance comprises utilizing a link intensity estimate.

10. The method according to claim 1 further comprising transmitting a signal from the at least one low-frequency receiver to a mesh network, the mesh network comprising a plurality of sensors within a facility.

11. A system for determining a real-time location of an object within a facility, the system comprising:
   a plurality of low-frequency magnetic induction transmitters, each of the plurality of low-frequency magnetic induction transmitters comprising at least one orthogonally oriented transmit coil, each of the plurality of low-frequency magnetic induction transmitters configured to transmit a signal packet comprising a unique transmitter identifier code and a coil orientation code; and
   a plurality of low-frequency receivers, each of the plurality of low frequency receivers configured to receive the signal packet, decode the signal packet, and estimate a distance from the low-frequency magnetic induction transmitter to the low-frequency receiver based on the decoded signal packet.

12. The system according to claim 11 further comprising a processor, the processor configured to receive the distance information and determine a location of an object.

13. The system according to claim 12 wherein the processor is a context aware location engine.

14. The system according to claim 11 wherein the distance drives a workflow.

15. The system according to claim 11 wherein the estimated distance provides context for at least one of an interaction, a workflow milestone and a departure.

16. The system according to claim 11 wherein the at least one low-frequency magnetic induction transmitter comprises at least one of radiofrequency transmitter, an ultrasound transmitter and an infrared transmitter.

17. The system according to claim 1 wherein the at least one low-frequency magnetic induction transmitter comprises a WiFi transmitter, a BLUETOOTH transmitter and a ZIGBEE transmitter.

18. The system according to claim 11 wherein each of the plurality of low-frequency magnetic induction transmitters is configured to drive each coil with multiple power levels; each plurality of low-frequency receivers is configured to determine an effective signal strength by correlating a number of signal packets received from each transmit coil with a corresponding power level of each of the plurality of low-frequency magnetic induction transmitters; and a resulting value is a threshold for reception and is related to an effective RSSI.

19. The system according to claim 11 wherein each of the plurality of low-frequency magnetic induction transmitters is configured to encode both a unique device code and a transmit power level indication, and each plurality of low-frequency receivers is configured to estimate a link strength using the lowest power level indication code received from a particular low-frequency magnetic induction transmitter of the plurality of low-frequency magnetic induction transmitters.

20. The system according to claim 11 wherein the receiver has a variable gain amplifier and automatic gain control to automatically adjust a gain to maintain a constant output level, and an adjusted gain level is inversely proportional to the received signal strength and is used for RSSI calculation.

21. The system according to claim 11 wherein the combination of two or more signal packets received from two or more transmitter orientations located at a common point are combined in vector magnitude form to produce an orientation invariant signal strength.

22. The system according to claim 11 wherein each of the plurality of low-frequency magnetic induction transmitters synchronizes the signal packet transmissions to reduce over-the-air collisions.

23. The system according to claim 11 wherein each of the plurality of low-frequency magnetic induction transmitters uses motion activation to trigger signal packet transmissions by each of the plurality of low-frequency magnetic induction transmitters in an area.

24. The system according to claim 11 further comprising a plurality of sensors positioned within a facility.

25. The system according to claim 24 wherein the plurality of sensors forms a mesh network.

26. The system according to claim 25 further comprising at least one position engine in communication with the mesh network.

* * * * *